United States Patent
Cerrano

[19]

[11] Patent Number: 6,109,588
[45] Date of Patent: Aug. 29, 2000

[54] TWO-WAY VARIABLE-SECTION CONTROL VALVE FOR A REFRIGERATION CIRCUIT

[75] Inventor: Valter Cerrano, Turin, Italy

[73] Assignee: Microtecnica S.p.A., Turin, Italy

[21] Appl. No.: 08/819,264

[22] Filed: Mar. 18, 1997

[30] Foreign Application Priority Data

Mar. 19, 1996 [IT] Italy ................... TO96A0215

[51] Int. Cl.$^7$ .......................... F16K 31/04; G05D 23/02; G05D 23/24
[52] U.S. Cl. ............... 251/11; 60/528; 236/68 R
[58] Field of Search ............... 236/68 R, 68 B, 236/92 B, 101 R, 100; 60/527, 528; 251/11

[56] References Cited

U.S. PATENT DOCUMENTS

| | | |
|---|---|---|
| 2,047,722 | 7/1936 | Work .......................................... 251/11 |
| 2,810,523 | 10/1957 | Branson ................................. 236/34.5 |
| 3,109,454 | 11/1963 | Whitlock et al. .......................... 251/11 |
| 3,169,008 | 2/1965 | Whitlock ..................................... 251/11 |
| 3,381,701 | 5/1968 | Sherwood et al. ......................... 251/11 |
| 3,397,859 | 8/1968 | Barnett ....................................... 251/11 |
| 3,439,711 | 4/1969 | Sherwood et al. ......................... 251/11 |
| 3,537,678 | 11/1970 | Shmueli et al. ............................ 251/11 |
| 3,860,169 | 1/1975 | Norman ...................................... 251/11 |
| 3,967,781 | 7/1976 | Kunz ...................................... 236/68 R |
| 4,043,532 | 8/1977 | Draxler ....................................... 251/11 |
| 4,235,413 | 11/1980 | Baker ......................................... 251/11 |
| 4,460,007 | 7/1984 | Pirkle ......................................... 251/11 |
| 4,666,081 | 5/1987 | Cook et al. ................................ 251/11 |
| 4,685,651 | 8/1987 | Nouvelle et al. .......................... 251/11 |
| 4,776,559 | 10/1988 | Fornasari .................................... 251/11 |

FOREIGN PATENT DOCUMENTS

| 2155153 | 9/1985 | United Kingdom .................. 236/34.5 |
| 2 281 412 | 4/1994 | United Kingdom . |

Primary Examiner—George L. Walton
Attorney, Agent, or Firm—Gary M. Nath; Gregory B. Kang; Nath & Associates

[57] ABSTRACT

A two-way variable-section control valve for a refrigeration circuit, having a movable member for choking a refrigerant passage interposed between the inlet and outlet of the valve; the position of the movable member is controlled by a wax actuator having a bulb fitted with an electric resistor supplied by a control circuit; and the bulb is immersed in and cooled rapidly by the refrigerant when the heat supplied by the resistor is reduced, thus ensuring rapid response.

10 Claims, 1 Drawing Sheet

TWO-WAY VARIABLE-SECTION CONTROL VALVE FOR A REFRIGERATION CIRCUIT

BACKGROUND OF THE INVENTION

The present invention relates to a two-way variable-section control valve, particularly for controlling the evaporation pressure of a refrigeration circuit, and which may be used to advantage, though not exclusively, in aircraft air conditioning systems.

Known valves of the above type substantially comprise a body having an inlet conduit and an outlet conduit for refrigerant; and a movable member for choking the section of a refrigerant passage between the inlet and the outlet.

The movable member is normally controlled by a thermal actuator comprising a heat-sensitive element, and an output member which is moved by and according to the temperature of the heat-sensitive element, the temperature of which may be varied by means of an electric resistor and controlled electronically. The heat-sensitive element normally comprises one or more bimetallic blades deformable alongside a variation in temperature, or a deformable bulb containing a liquid in equilibrium with its saturated vapor.

Known valves of the type briefly described above present several drawbacks.

In particular, response is normally poor, due to the time taken for the heat-sensitive element to cool when the heat supplied by the resistor is cut off.

Known valves are therefore only suitable for use in substantially static conditions, such as refrigerators or static room conditioners for maintaining a substantially constant temperature and involving only a gradual variation in load, and are totally unsuitable for use in widely and rapidly varying conditions such as those encountered, for example, in the cockpit of an aircraft.

Moreover, known valves are normally sensitive to ambient and/or refrigerant pressure, so that the operating point of the valve does not depend solely on the supply voltage of the electric resistor.

This further rules out the use of known valves on aircraft, which are obviously subject to widely varying altitudes and, hence, pressures.

SUMMARY OF THE INVENTION

It is an object of the present invention to provide a two-way control valve for a refrigeration circuit, designed to overcome the aforementioned drawbacks typically associated with known valves.

According to the present invention, there is provided a two-way control valve for a refrigeration circuit, of the type comprising a casing having an inlet and an outlet for a refrigerant, and defining, for said refrigerant, conduit means interposed between said inlet and said outlet, said conduit means comprising at least one passage for said refrigerant; a movable member for choking said passage to define a variable-section passage; and a thermal actuator for controlling said movable member; said thermal actuator comprising a heat-sensitive element, temperature regulating means for regulating the temperature of said heat-sensitive element, and a control element activated by said heat-sensitive element and secured to said movable member; characterized in that at least a portion of said heat-sensitive element is housed in said conduit means in a condition of heat exchange with said refrigerant.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
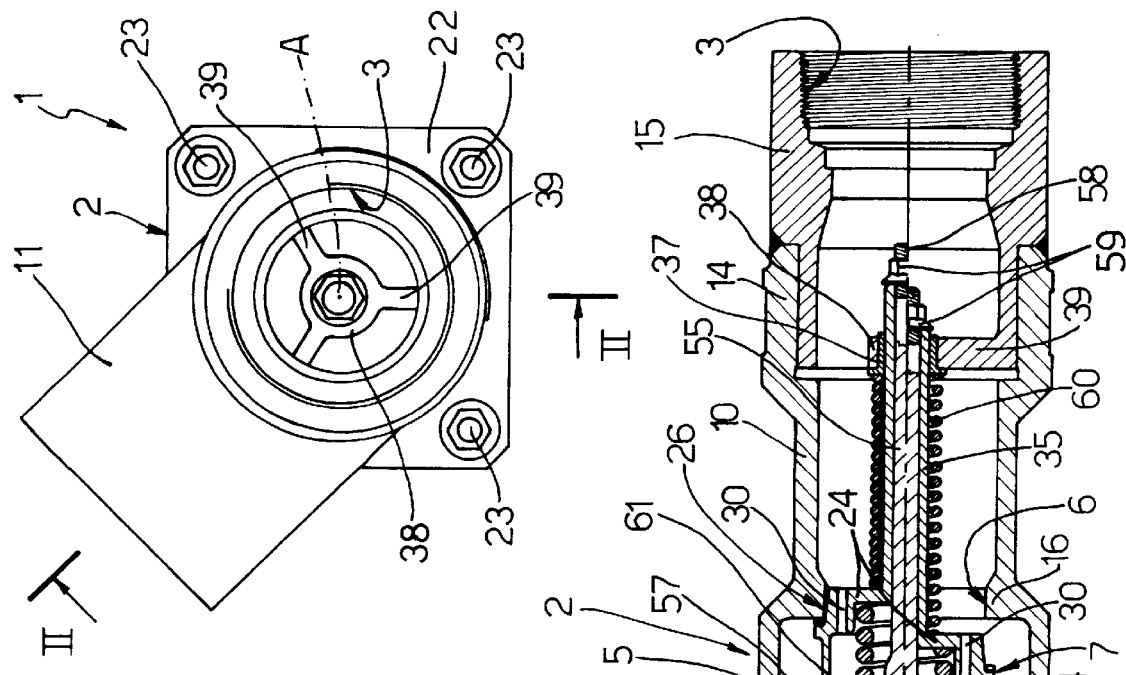
FIG. 1 shows a front view of a valve in accordance with the present invention.

Number 1 in the accompanying drawings indicates a two-way variable-section control valve for a refrigeration circuit.

Valve 1 may conveniently be used to control the evaporation pressure of a refrigeration circuit forming part of an aircraft air conditioning system (not shown) of the type described, for example, in Italian Patent Application n. TO94A-000727.

Valve 1 comprises a casing 2 having an inlet 3 and an outlet 4 for a refrigerant; and casing 2 defines internally a refrigerant conduit 5 interposed between inlet 3 and outlet 4 and comprising a passage 6.

Valve 1 also comprises a movable member 7 housed inside casing 2 and for choking passage 6 to define a variable-section passage for the refrigerant.

More specifically, casing 2 comprises an elongated tubular main body 10 of axis A, one axial end 14 of which is welded with a tubular fitting 15 defining inlet 3. Body 10 comprises an intermediate tubular radial appendix 11 defining outlet 4; and an inner annular shoulder 16 in an intermediate position between inlet 3 and outlet 4, and which defines refrigerant passage 6.

Casing 2 also comprises a tubular sleeve 19 projecting inside and coaxially with body 10 from the axial end of body 10 opposite end 14. Sleeve 19 comprises an end flange 21 fitted to a corresponding end flange 22 of body 10 by means of a number of bolts 23, extends axially just short of shoulder 16, and defines a cylindrical cavity 20 communicating with conduit 5 by means of a number of holes 12 formed in sleeve 19.

Figure 2:
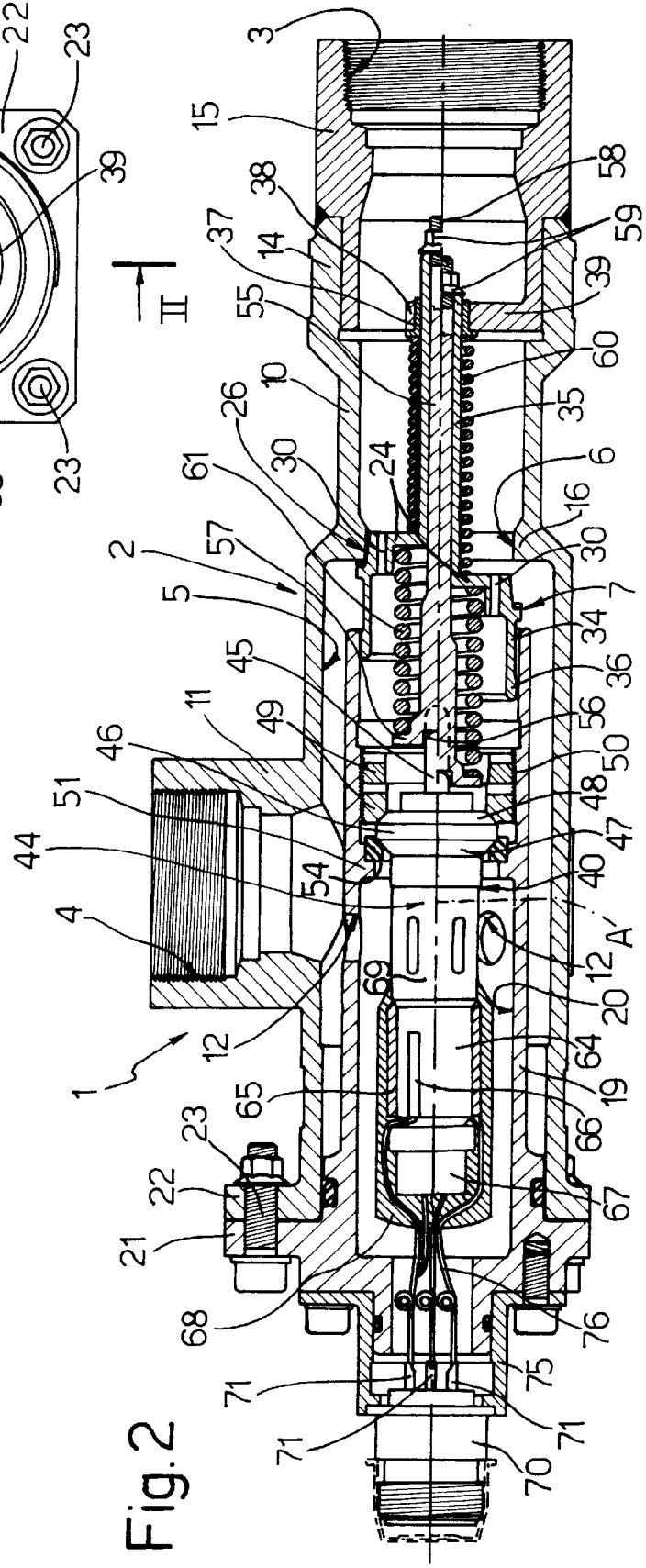
FIG. 2 shows a section along line II—II in FIG. 1.

Movable member 7 comprises a circular piston 24 defined by a conical lateral surface 26 tapering towards inlet 3, and which slides along axis A between a withdrawn fully-open position of valve 1 (shown at the bottom of FIG. 2) in which piston 24 clears passage 6, and a fully-closed position (shown at the top of FIG. 2) in which piston 24 engages passage 6 and lateral surface 26 cooperates with shoulder 16. Surface 26 conveniently comprises a number of longitudinal grooves (not shown) for allowing a minimum amount of refrigerant through the piston, even in the fully-closed position; and piston 24 comprises a number of axial through holes 30 to equalize the pressure up- and downstream from the piston.

Movable member 7 also comprises a pair of tubular portions 34, 35 for supporting and guiding piston 24, and extending axially on opposite sides of the piston.

More specifically, portion 34 extends from an outer periphery of piston 24 into sleeve 19, and comprises an annular end portion 36 mating in sliding manner with sleeve 19; and portion 35 is elongated and tubular in shape, is smaller in diameter than portion 34, and is supported in sliding manner inside a bush 37 fitted to a support 38 connected integrally to fitting 15 by means of a number of radial spokes 39.

Valve 1 also comprises a thermal wax actuator 40 for controlling movable member 7.

Actuator 40 comprises a heat-sensitive bulb 44 containing wax (not shown); and a push-rod control element 45 extending from an axial end of bulb 44 and movable axially by the wax, which gradually melts and expands alongside an increase in temperature. Actuator 40 is housed inside cavity 20, coaxially with sleeve 19, and with control element 45 facing movable member 7.

Bulb 44 is substantially in the form of an elongated cylinder of axis A, and, close to the end facing control element 45, comprises an annular projection 46 defined axially by two conical sides 47, 48, and having a substantially trapezoidal section.

Actuator 40 is fixed inside cavity 20 by means of a pair of ring nuts 49 screwed to an internal thread 50 on sleeve 19, and which clamp projection 46 against an inner shoulder 51 of sleeve 19 via the interposition of a supporting ring 54. Ring 54 and the ring nut 49 contacting projection 46 comprise respective conical surfaces cooperating with sides 47 and 48 to axially clamp and radially center projection 46 and so ensure actuator 40 is assembled coaxially with sleeve 19.

Control element 45 cooperates axially with a rod 55 of axis A and fitted in sliding manner inside movable member 7. At the end adjacent to control element 45, rod 55 comprises an axial seat 56 for control element 45, and a circular flange 57; and the threaded opposite end 58 of rod 55 is fitted with a self-locking nut 59 defining an axial support for the free end of tubular portion 35 of movable member 7.

A first coil spring 60 is fitted coaxially to portion 35 of movable member 7, and is compressed axially between piston 24 and bush 37; and a second coil spring 61 is fitted about rod 55, and rests at the ends on piston 24 and flange 57 of rod 55.

Movable member 7 is thus supported flexibly, in the axial direction, between control element 45 (integral with rod 55 by virtue of spring 61) and fixed support 38 (integral with bush 37), and assumes an axial position defined by balanced elastic thrusts of springs 60 and 61. As spring 61 is far more rigid than spring 60, movable member 7, as it travels between the fully-open and fully-closed positions, may be said to be secured substantially rigidly to control element 45, and opposed elastically by spring 60.

An end portion 64 of bulb 44, at the opposite end to control element 45, is surrounded by a resistor 65 for controlling the temperature of the bulb, and houses a thermocouple 66 for monitoring the temperature of bulb 44, and a thermal switch 67 series-connected to resistor 65 and for cutting off supply when the temperature of bulb 44 exceeds a predetermined threshold value.

Resistor 65 and thermal switch 67 are encased in a layer 68 of synthetic insulating resin to ensure they "feel" the temperature of bulb 44 with no heat exchange with the refrigerant contained, in use, inside cavity 20.

An intermediate portion 69 of bulb 44, on the other hand, is exposed to allow the refrigerant, in use, to flow over bulb 44.

Valve 1 also comprises an electric connector 70 housed inside an end cover 75 fitted to flange 21 of sleeve 19; and connector 70 comprises a number of electric terminals 71 connected to resistor 65, thermocouple 66, and switch 67 by means of respective cables 76.

Connector 70 connects valve 1 electrically to an electronic control circuit (not shown) for regulating the temperature of bulb 44 by modulating the supply voltage of resistor 65.

Operation of valve 1 will now be described as of the fully-open condition (bottom of FIG. 2), which is the steady-state condition in the absence of supply to resistor 65, and in which the wax in bulb 44 is solid, control element 45 is withdrawn, and piston 24 is maintained in the fully-open limit position by spring 60.

When resistor 65 is energized, the temperature of bulb 44 increases, the wax gradually melts, and control element 45 moves out to move piston 24, via rod 55 and spring 61, into the closed position. Spring 61 transmits the load substantially rigidly, whereas spring 60 is compressed gradually.

Over the final portion of its travel, piston 24 slides inside passage 6, and the conical shape of surface 26 provides for slowly varying the section of the passage according to the axial position of piston 24.

By the time bulb 44 reaches a maximum rated temperature, e.g. 60° C., the wax is completely liquified, which condition (top of FIG. 2) corresponds to piston 24 reaching the end of its work stroke and contacting shoulder 16 of body 10. The section of the passage is thus reduced to the minimum value defined by the grooves (not shown) on surface 26, through which refrigerant continues to circulate.

Though the above constitutes a limit operating condition, provision is also made for bulb 44 exceeding the maximum rated temperature in special circumstances (e.g. in the event the valve is stored in a particularly hot environment). In which case, control element 45 travels beyond the limit position (as shown by the dotted line in FIG. 2), so that rod 55 moves axially with respect to movable member 7 and in opposition to spring 61, which is deformed considerably. This prevents actuator 40 from being overloaded mechanically to the extent of being damaged.

When the heat supplied by resistor 65 is reduced or cut off, bulb 44 cools rapidly due to heat exchange with the refrigerant flowing over it, so that piston 24, responding rapidly to the change in the control signal, is restored to the fully-open position.

The advantages of valve 1 according to the teachings of the present invention will be clear from the foregoing description.

Firstly, bulb 44 of the wax actuator, by being constantly immersed in the refrigerant, responds rapidly to a reduction in heat supply by resistor 65, thus ensuring rapid response of the valve, and enabling the valve to be used in applications subject to sharp, sudden variations in load of the refrigeration system.

Secondly, as movable member 7 is fully housed inside conduit 5 in such a manner as to be subjected to the hydrostatic thrust exerted by the refrigerant, ambient pressure and the pressure of the refrigerant itself are totally ineffective as regards control of the valve. As such, valve 1 is unaffected by altitude, and, as the temperature of bulb 44 biuniquely corresponds to a specific position of movable member 7, control of the valve is highly straightforward.

Finally, valve 1 is highly straightforward mechanically, and therefore compact, reliable and lightweight.

All the above advantages combine to make the valve according to the invention especially suitable for aircraft application.

Clearly, changes may be made to valve 1 as described and illustrated herein without, however, departing from the scope of the present invention. In particular, actuator 40 may be replaced by a thermal actuator of any type.

I claim:

1. A two-way control valve for a refrigeration circuit, comprising a casing and having an inlet, an outlet and a conduit connecting said inlet and outlet and through which a refrigerant can flow, said conduit comprising at least one passage for said refrigerant; a movable member for restricting said passage so as to provide a passage section variable between a minimum value corresponding to a closed position of said movable member and a maximum value corresponding to an open position of said movable member; and a thermal actuator means for controlling said movable member, said thermal actuator means comprising a heat-sensitive element, temperature regulating means for regulating the temperature of said heat-sensitive element, and a control element activated by said heat-sensitive element and secured to said movable member; said casing including a cavity communicating with said conduit; at least a portion of said heat-sensitive element being located in said cavity in a condition of heat exchange with said refrigerant, wherein said movable member includes a piston having a portion slidably mating with a tubular portion of said casing and provided with at least a through aperture, said piston being thereby subjected to a balanced hydrostatic force of said refrigerant.

2. A valve as claimed in claim 1, characterized in that said thermal actuator means is a wax actuator.

3. A valve as claimed in claim 2, characterized in that said heat-sensitive element is a wax bulb; and said temperature regulating means comprise a resistor applied to at least a portion of said bulb.

4. A valve as claimed in claim 3, characterized by comprising thermal insulating means interposed between said resistor and said conduit.

5. A two-way control valve for a refrigeration circuit, comprising a casing and having an inlet, an outlet and a conduit connecting said inlet and outlet and through which refrigerant can flow, said conduit comprising at least one passage for said refrigerant; a movable member for restricting said passage so as to provide a passage section variable between a minimum value corresponding to a closed position of said movable member and a maximum value corresponding to an open position of said movable member; and a thermal actuator means for controlling said movable member, said thermal actuator means comprising a heat-sensitive element, temperature regulating means for regulating the temperature of said heat-sensitive element, and a control element activated by said heat-sensitive element and secured to said movable member; said casing including a cavity communicating with said conduit; at least a portion of said heat-sensitive element being located in said cavity in a condition of heat exchange with said refrigerant, wherein said movable member is interposed between supporting means, fixed to said casing, and said control element of said thermal actuator means; first elastic means being interposed between said movable member and said supporting means and second elastic means being interposed between said movable member and said control element; wherein said second elastic means are more rigid than said first elastic means in order to connect said movable member to said control element in a substantially rigid manner as said movable member travels from said open position to said closed position in opposition to said first elastic means but to allow said control element to move with respect to said movable member beyond a position corresponding to said closed position of said movable member.

6. A valve as claimed in claim 5, characterized in that said casing comprises a tubular main body defining said conduit interposed between said inlet and said outlet; and a tubular sleeve housed coaxially in said main body and defining an inner cavity communicating through at least one opening in said sleeve with said conduit; said thermal actuator means being housed and supported in said cavity of said sleeve.

7. A valve as claimed in claim 6, characterized in that said movable member comprises an intermediate piston cooperating with said passage; and end portions mating in sliding manner with said sleeve and said supporting means.

8. A valve as claimed in claim 7, characterized in that said piston comprises at least one axial through hole.

9. A valve as claimed in claim 7, characterized in that said piston comprises a conical surface cooperating with said passage.

10. A valve as claimed in claim 7, characterized by comprising a rod cooperating with said control element of said actuator means, and having supporting means for said second elastic means; said movable member being mounted coaxially and in sliding manner with respect to said rod.

* * * * *